Dec. 23, 1969  S. I. REED  3,485,697
METHOD AND APPARATUS FOR FORMING A PLASTIC BAG
WITH AN INTEGRAL POUCH
Filed Dec. 6, 1966  2 Sheets-Sheet 1
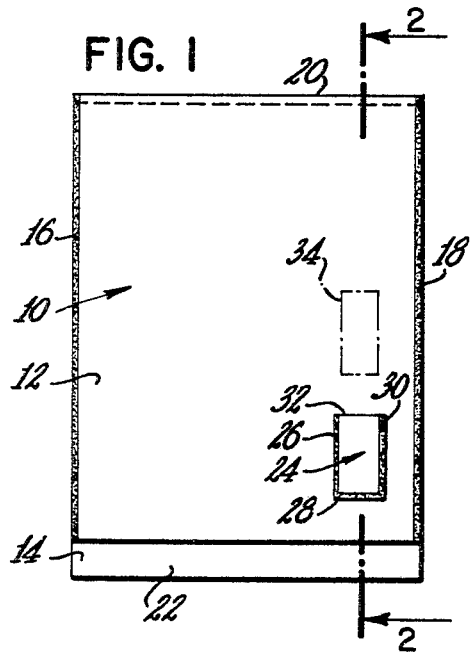
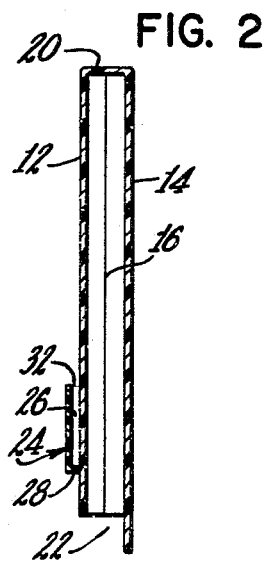
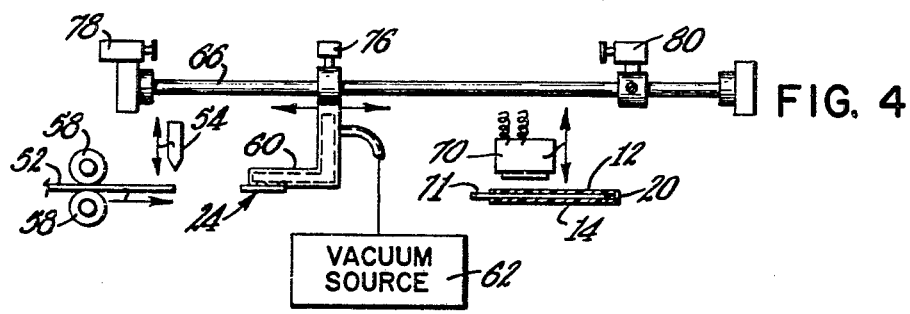
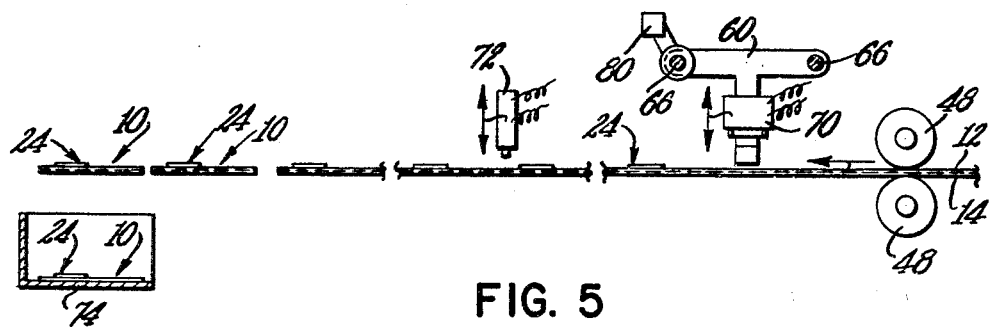
INVENTOR.
STANLEY I. REED
BY
Leonard H. King
ATTORNEY

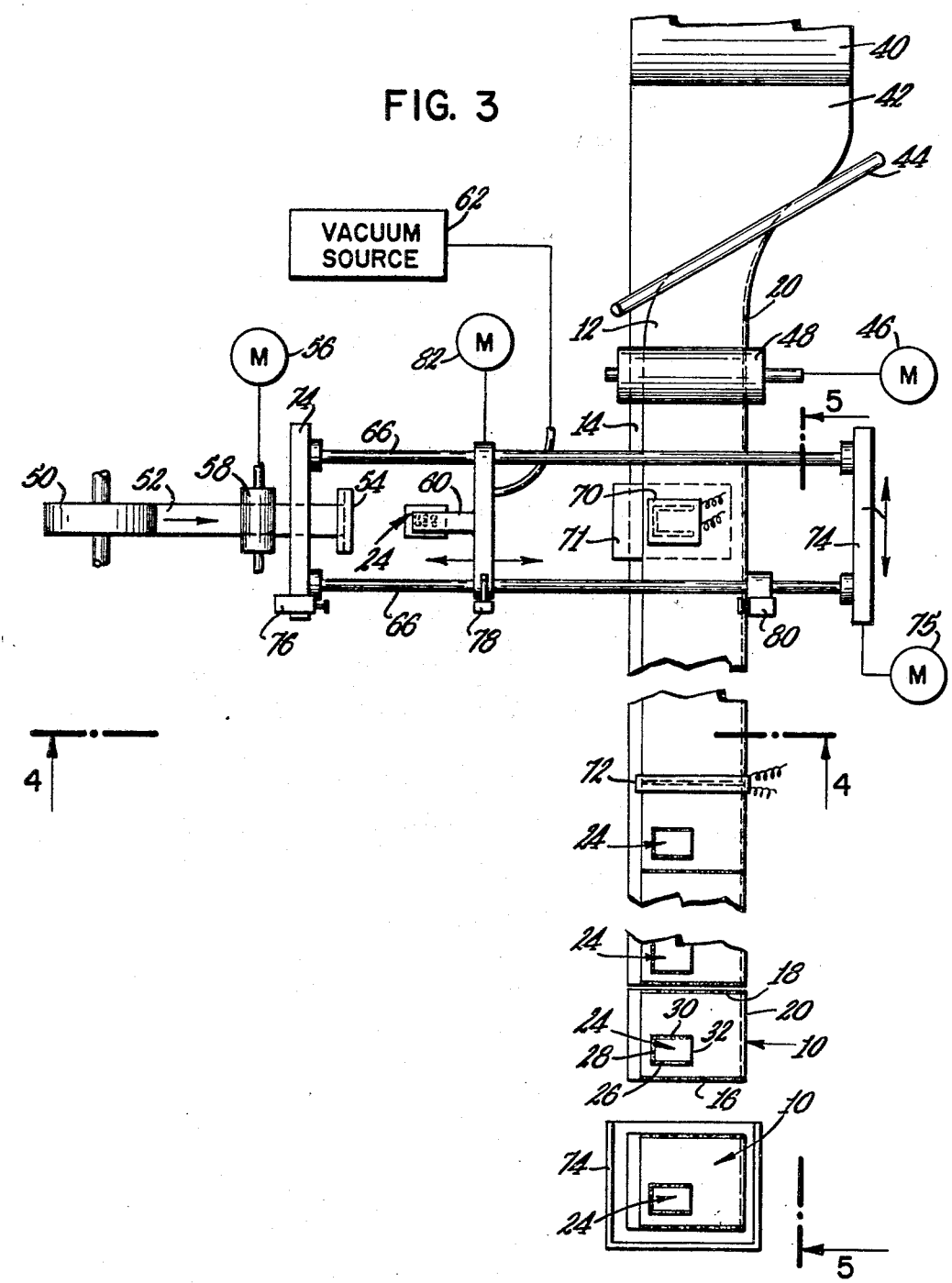

United States Patent Office

3,485,697
Patented Dec. 23, 1969

3,485,697
METHOD AND APPARATUS FOR FORMING A PLASTIC BAG WITH AN INTEGRAL POUCH
Stanley I. Reed, Wantagh, N.Y., assignor to Cellu-Craft Inc., Lake Success, N.Y.
Filed Dec. 6, 1966, Ser. No. 599,493
Int. Cl. B32b *31/10, 31/26, 31/18*
U.S. Cl. 156—265
19 Claims

ABSTRACT OF THE DISCLOSURE

A method and apparatus for forming a plastic bag with an integral pouch is disclosed. A plastic patch is secured along three edges thereof to one layer of a plastic bag to thereby define an integral pouch for the insertion of an indicia bearing tag therein.

---

This invention relates generally to plastic containers and more particularly to a method and apparatus for fabricating a plastic bag having a pouch formed integrally with the outside surface thereof.

In order to maintain a clean and fresh looking appearance, many types of merchandise are presently being displayed in plastic bags. The inventory control and price tags for the merchandise are then applied to the bag. Usually this is done with pins or other suitable fasteners after the merchandise is sealed in the bag. This very often results in damage to the bag and/or the material inside. It will readily be recognized that the elimination of fasteners would result in several substantial benefits.

First, if the fasteners are eliminated there will be no sharp points that can damage the merchandise or injure someone handling the bag. Second, the elimination of conventional fasteners to secure tags allows for faster and less costly changeovers, for example when the price is changed or when the merchandise is returned for refund or exchange. Finally, by using the present invention, the cost of appylying tags to merchandise can be reduced while at the same time providing an improved appearance for the package.

The present invention is intended as an attachment for a conventional bag making machine, for example the type that utilizes a folded over sheet of plastic. This portion of the bag making machine is well known in the art and forms part of the invention only in combination with the pouch applying structure.

A second supply roll of heat sealable plastic film is positioned proximate the bag making machine. Means are provided for cutting and delivering small pouch sections of the second supply roll to the folded over bag web. Movement of the cut pouch sections is at right angles to the movement of the bag web and the transport means in the embodiment illustrated is a vacuum finger. In addition, means are provided for precisely determining the position of the pouch. Control means limit the transverse movement of the vacuum finger and a carriage supports the vacuum finger so that it may be moved parallel to the line of direction of the main web movement.

Once the pouch piece of plastic is properly positioned heat sealing means join it to the bag web. It is essential that the pouch piece be sealed on as flat as possible so that the space between the pouch and web is at a minimum. By having the pouch tight when it is assembled, there is a little likelihood that the tag will accidentally fall out. Conventional means to advance the bag web and transversely seal the transverse sides and cut off each bag from the main web are then utilized to complete the operation.

Accordingly, an object of this invention is to provide an improved method for manufacturing a plastic bag with an integral plastic pouch.

A further object of this invention is to provide apparatus for manufacturing a plastic bag with an integral pouch.

These and other objects, features and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

In the drawing:

FIG. 1 is a plan view of a plastic bag formed in accordance with the method and by the apparatus of this invention;

FIG. 2 is an enlarged, fragmentary sectional view taken through the pouch along line 2—2 of FIG. 1;

FIG. 3 is a schematic plan view illustrating the apparatus used to practice this invention;

FIG. 4 is a schematic side elevational view of the FIG. 3 apparatus taken along line 4—4 of FIG. 3; and FIG. 5 is another schematic side elevational view of the FIG. 3 apparatus taken along line 5—5 of FIG. 3.

A polyethylene bag 10 is shown in FIG. 1 and FIG. 2. As will be described in more detail hereinafter, the bag is comprised of top and bottom layers 12 and 14, respectively. Two edges and two sides, 16, 18 and 20, 22, respectively, are defined by the superimposed layers with edges 16 and 18 being heat sealed, side 20 being the fold line of the two plastic layers and side 22 being open for the insertion of the article. Pouch 24 is another small area of polyethylene that is heat sealed to top layer 12 along edges 26, 28 and 30 with side 32 remaining open to permit insertion of the indicia bearing tag 34 that is shown in phantom in FIG. 1.

Referring now to FIGS. 3, 4 and 5, the apparatus for securing a pouch to a bag is shown schematically in combination with a conventional bag making machine. Supply roll 40 contains the main source of polyethylene sheet 42 that forms the body of container 10. Conventional folding means, generally designated at 44, folds the sheet over on itself to form layers 12 and 14 which are defined, in part, by side 20. Suitable drive means shown schematically as motor 46 and drive roller 48 intermittently advance the folded sheet along a path parallel to the longitudinal axis thereof. The movement of the main web is in timed relationship with the pouch applying mechanism that will be described hereinafter. Many forms of drive means are well known in the prior art so that their precise structure need not be described in detail.

A second supply roll 50 is positioned downstream of the folding means and is arranged to deliver a relatively narrow strip 52 of polyethylene to a cut-off knife 54. Suitable drive means, shown schematically as motor 56 and driver rollers 58, are arranged to move strip 52 along a path perpendicular to but in substantially the same horizontal plane as the folded layers. At the proper moment a pickup finger 60 coupled to a vacuum producing member 62 engages the cut-off portion 24 of the strip. Pickup finger 60 is integral with a carriage 64 that is slidably mounted on a pair of spaced parallel guide rods 66, so that the cut-off portion 24 may be moved from a position at the knife 54 to a position directly over the folded over layers.

When the pouch piece 24 that is cut from strip 52 is properly positioned, a heat sealing member 70 secures the severed pouch piece to upper layer 12 along edges 26, 28 and 30. To assure that pouch piece 24 is not sealed to the bottom layer, a heat barrier 71 is interposed between the layers 12 and 14 at the heat sealing station. Side 32 remains open to form a pouch in which is inserted the indicia bearing tag 34. At this time the vacuum is broken so that carriage 64 may return to its original position proximate the cut-off knife. While the carriage is being moved away the main web, with the pouch sealed thereon, is advanced longitudinally, bringing a new area of the web into the path of the carriage and also delivering the sealed-on pouch to the next station.

After the pouch has been secured and the assembly advanced, heat sealing and cutoff means 72 are applied to the superimposed layers to form seals along edges 16 and 18. Because the original material was folded over, edge 20 is closed, leaving only end 22 open for the insertion of the merchandise. Conventional collecting means shown only as a box 74 receives the assembled bags.

FIG. 3 also illustrates means for controlling the movement of the pouch applying mechanism. The rods 66, on which the carriage 64 is slidably mounted, is carried by end frames 74. As shown by the vertically positioned directional arrow in FIG. 3, the frames, together with the rods, the carriage and the vacuum finger, are movable in a direction parallel to the line of movement of the main bag web. This may be accomplished either manually or with suitable drive means shown schematically as motor 75 so that the pouch may be delivered accurately to the desired part of the ultimate bag width.

In addition, carriage 64 includes an actuating arm 76 that is arranged to abut switches 78 and 80 at each end of travel of the carriage. When arm 76 contacts switch 78, movement of the carriage and pickup finger towards the supply roll 50 is halted. Motor 56 and cutoff knife 54 are also connected to and controlled by switch 78 in order to advance the web and cut the leading section thereof. Vacuum is then applied to the cut pouch piece and the carriage is ready to start its return run to the vicinity of the main web.

Switch 80 is adjustably mounted longitudinally on one of the rods 66 so that the pouch piece may be accurately positioned. When arm 76 contacts switch 80 movement of the carriage is stopped and the heat-sealing member 68 is brought into contact with the three edges of the pouch piece. Vacuum to finger 60 is broken and by suitable means, such as illustrated schematically by motor 82, the carriage is again moved to the left. The making and breaking of the vacuum as well as the driving of motor 82 may all be controlled by switch 80. It should be noted that the adjustability of location of switch 80 permits very precise location of the end of travel of the vacuum finger and therefore very precise location of the pouch piece with respect to the width of the main web.

Having thus disclosed the best embodiment of the invention presently contemplated, it is to be understood that various changes and modifications may be made by those skilled in the art without departing from the spirit of the invention.

What is claimed is:

1. Apparatus for applying a pouch to a container formed from a longitudinally moving web of superimposed layers of thermoplastic material, said apparatus comprising:
   (a) transport means arranged to grasp and deliver a strip of thermoplastic material to a superimposed position over the top web layer; and
   (b) heat sealing means operating in timed relation with said transport means to secure only marginal edges of the strip of thermoplastic material to the web layers.

2. The apparatus in accordance with claim 1 wherein said transport means comprises a vacuum pickup finger having an interior chamber and a plurality of apertures on the bottom surface thereof and conduit means in communication with said chamber, said conduit means being adapted to be coupled to a vacuum inducing source.

3. The apparatus in accordance with claim 1 wherein the pouch is originally in the form of a continuous strip and wherein there is included knife means to sever a portion of the strip in timed relationship with the movement of said transport means.

4. The apparatus in accordance with claim 1 including guide means positioned perpendicularly to the longitudinal path of the moving web and a carriage supporting said transport means, said carriage being arranged to slide on said guide means between a pouch grasping station and a position above the web whereby the bottom of said transport means is in substantially the same plane as the web.

5. The apparatus in accordance with claim 1 including means to move said transport means in a direction parallel to the direction of the web movement.

6. The apparatus in accordance with claim 1 including means to limit the movement of said transport means in a first direction towards the web and a second direction away from the web, both directions being perpendicular to the path of the web movement.

7. The apparatus in accordance with claim 6 wherein said means to limit the movement of said transport means is adjustable for the first direction of movement of said transport means.

8. The apparatus in accordance with claim 1 including means to intermittently bring said heat sealing means into contact with the web.

9. Apparatus for forming a container comprising in combination:
   (a) first drive means for a first web comprising a double layer of thermoplastic sheet material;
   (b) second drive means for a second web comprising a single layer of thermoplastic sheet material;
   (c) knife means arranged to sever the leading portion of the second web;
   (d) transport means operating in timed relation with said knife means to deliver the severed strip of the second web to a superimposed position over the first web;
   (e) first heat sealing means operating in timed relation with said transport means to secure at least three sides of the severed strip of the second web to the top surface of the first web; and
   (f) second heat sealing means operating in timed relation with said first heat sealing means, said second heat sealing means being arranged to form at least one transverse seal across the width of the second web.

10. The apparatus in accordance with claim 9 wherein said transport means comprises a vacuum pickup finger having an interior chamber and a plurality of apertures on the bottom surface thereof and conduit means in communication with said chamber, said conduit means being adapted to be coupled to a vacuum inducing source.

11. The apparatus in accordance with claim 9 including guide means positioned perpendicularly to the longitudinal path of the moving web and a carriage supporting said transport means, said carriage being arranged to slide on said guide means between a position proximate said knife means and a position above the web whereby the bottom of said transport means is in substantially the same plane as the web.

12. The apparatus in accordance with claim 9 including means to move said transport means in a direction parallel to the direction of the first web movement.

13. The apparatus in accordance with claim 9 including means to limit the movement of said transport means in a first direction towards the first web and a second direction away from the first web, both directions being perpendicular to the path of the first web movement.

14. The apparatus in accordance with claim 9 wherein said means to limit the movement of said transport means is adjustable for the first direction of movement of said transport means.

15. The apparatus in accordance with claim 9 including means to intermittently bring said heat sealing means into contact with the first web.

16. The method of forming a pouched container comprising the steps of:

(a) intermittently advancing a first web consisting of a double layer of thermoplastic sheet material along a longitudinal path;

(b) severing the leading portion of a second web consisting of a single layer of thermoplastic sheet material;

(c) intermittently advancing the severed portion of the second web along a path perpendicular to the movement of the first web whereby the severed portion is positioned directly over the top layer of the first web;

(d) heating sealing only the marginal edges of the severed portion of the second web to the first web at a time between the intermittent movements of the first web; and (e) sealing the upper and lower layers of the first web to each other along spaced, parallel, transverse lines after the severed portion of the second web has been secured.

17. The method in accordance with claim 16 wherein the step of advancing the severed portion of the second web comprises the steps of applying a vacuum to the severed portion and then moving the vacuum applying means between the severing station and the path of the first web.

18. The method in accordance with claim 16 wherein the step of securing the severed portion of the second web to the first web comprises the step of applying heat to the severed portion when it is positioned above the first web.

19. The method in accordance with claim 16 wherein step (e) includes the step of severing the fully assembled container from the remainder of the first web.

References Cited

UNITED STATES PATENTS 2,684,775  7/1954  Von Hoff _____ 156—521

DOUGLAS J. DRUMMOND, Primary Examiner

U.S. Cl. X.R.

156—290, 519